Figure 1:
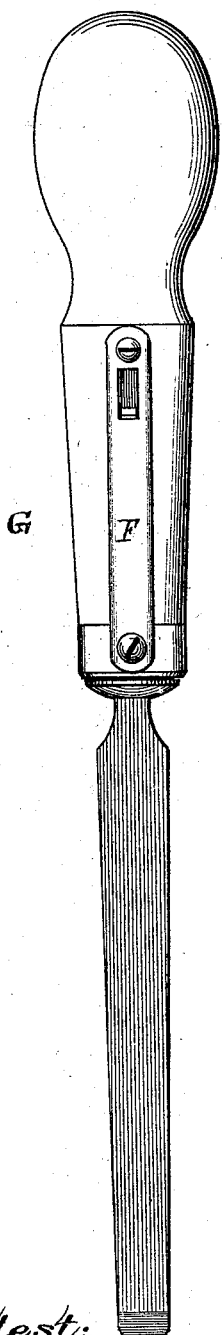
Figure 2:
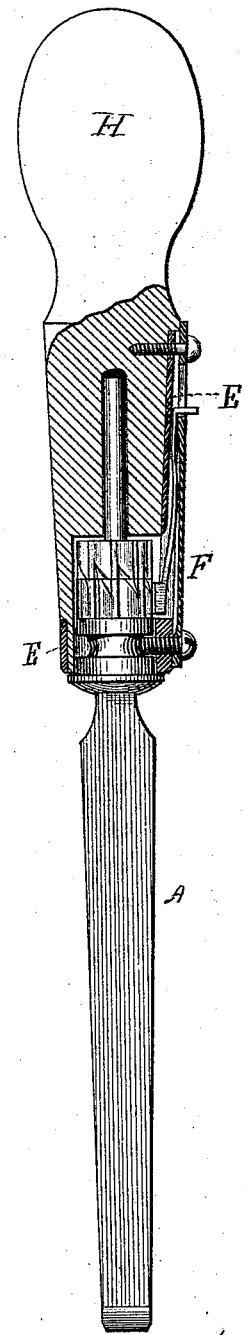
Figure 3:
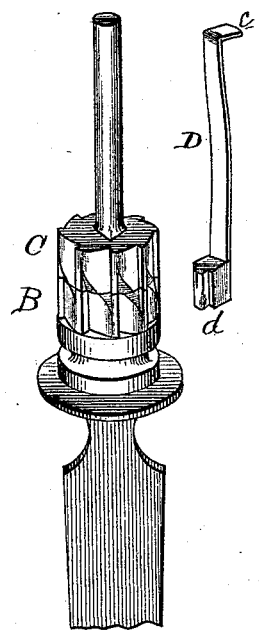

D. C. RICHARDS.
SCREW-DRIVER.

No. 176,811. Patented May 2, 1876.

Attest:
H. L. Perine
R. H. Whitley

Inventor.
Daniel C. Richards
By Peter A. Auer atty

UNITED STATES PATENT OFFICE.

DANIEL C. RICHARDS, OF REED CITY, MICHIGAN, ASSIGNOR OF ONE-FOURTH HIS RIGHT TO EMERSON W. TROUT, OF SAME PLACE.

IMPROVEMENT IN SCREW-DRIVERS.

Specification forming part of Letters Patent No. 176,811, dated May 2, 1876; application filed March 25, 1876.

*To all whom it may concern:*

Be it known that I, DANIEL C. RICHARDS, of Reed City, in the county of Osceola, in the State of Michigan, have invented a new and useful Improvement in Screw-Drivers; and I do hereby declare that the following is a full and exact description thereof, reference being had to the accompanying drawings, and to the letters of reference marked thereon, making a part of this specification.

My invention relates to improvements in screw-drivers; and consists of two ratchets attached to the shank of the screw-driver, and a spring, with a dog at one end, placed in position to act upon the ratchets. The said spring lies in a slot in an iron plate attached to the handle of the screw-driver.

A represents the shank of the screw-driver, with the ratchets in position. B and C represent the ratchets out of position, showing that they slide against the shoulder on the shank of the screw-driver, and are immovable when in position. D represents the spring, and d the dog, as attached. E represents the plate of iron attached to the ferrule, and contains the slot wherein the spring lies when in position. F represents a plate of iron, containing an oblong opening. This plate is fastened by means of two screws, overlying the plate with the slot containing the spring. The spring has upon one end a thumb-piece, c, which thumb-piece is placed in position, extending through the oblong opening in the iron plate represented by letter F. G represents the screw-driver, with its combinations in position.

The two ratchets above mentioned are similar in every particular and of equal dimensions. They are placed upon the shank of the screw-driver side by side. The inner margins of the ratchets are grooved, to allow the dog to slide from each one to the other. They are adjusted upon the shank in such a manner as to be operated by the dog, by means of sliding the spring in the slot before mentioned.

What I claim as my invention, and desire to secure by Letters Patent, is—

The combination of the screw-driver A, provided with ratchets B and C, with reciprocating spring-pawl D d, ferrule E, plate F, and handle H, substantially as and for the purpose specified.

DANIEL C. RICHARDS.

Witnesses:
- W. H. PALMER,
- L. D. WEBSTER.